United States Patent [19]
Richardson et al.

[11] Patent Number: 5,487,217
[45] Date of Patent: Jan. 30, 1996

[54] APPARATUS AND SYSTEM FOR INSTALLING RIVETS IN BELT FASTENERS

[76] Inventors: Thomas W. Richardson; Mary Jane Richardson, both of 934 Cleveland Rd., Hinsdale, Ill. 60521

[21] Appl. No.: 125,418

[22] Filed: Sep. 22, 1993

[51] Int. Cl.$^6$ .................................................. B23P 19/00
[52] U.S. Cl. .............................. 29/816; 29/798; 29/34 B; 29/525.2
[58] Field of Search ........................... 29/816, 822, 798, 29/34 B, 525.2

[56]  References Cited

U.S. PATENT DOCUMENTS

| | | | |
|---|---|---|---|
| 2,438,201 | 3/1948 | Buchet | 29/34 B |
| 3,742,557 | 7/1973 | François | |
| 3,913,180 | 10/1975 | Pray | |
| 4,019,238 | 4/1977 | Fuhrmeister | 29/798 |
| 4,065,045 | 12/1977 | Pray | |
| 4,208,776 | 6/1980 | Schleicher | 29/243.5 |
| 4,212,094 | 7/1980 | Pray | |
| 4,258,461 | 3/1981 | Pray | |
| 4,344,213 | 8/1982 | Pray | |
| 4,364,506 | 12/1982 | Schleider | 227/10 |
| 4,380,109 | 4/1983 | Pray | |
| 4,404,742 | 9/1983 | Fuhrmeister | 29/798 |
| 4,493,205 | 1/1985 | Ramey | 72/391 |
| 4,535,925 | 8/1985 | Ramey et al. | 227/55 |
| 4,620,657 | 11/1986 | Gladding et al. | |
| 4,688,711 | 8/1987 | Gladding et al. | |
| 4,864,713 | 9/1989 | Roberts et al. | 29/34 B |
| 4,885,836 | 12/1989 | Bonomi et al. | 29/525.2 |
| 5,169,047 | 12/1992 | Endres et al. | 29/34 B |

*Primary Examiner*—Irene Cuda
*Assistant Examiner*—Marc W. Butler
*Attorney, Agent, or Firm*—Gerstman, Ellis & McMillin, Ltd.

[57]  ABSTRACT

A belt fastener assembly attachment apparatus attaches belt fastener assemblies to the end of a belt with rivets and with a non-manually powered rivet assembly driving tool. A guide template having a plurality of guide apertures is alignable with the anvil die apertures of an anvil die plate. Each guide aperture receives and aligns the rivet assembly dispensing barrel of the non-manually powered rivet assembly drive tool to the anvil die apertures of an anvil die plate and rivet receiving apertures of the belt fastener. Guide pins carried by the guide template and received within guide apertures of the anvil die plate maintain the guide template apertures in registration with the anvil die apertures of the anvil die plate and the rivet receiving apertures of the belt fastener. A rivet assembly supply strip presents each rivet assembly one at a time in accurate registration with the rivet assembly dispensing barrel of the non-manually powered rivet assembly drive tool to assure accurate driving of each rivet assembly.

18 Claims, 6 Drawing Sheets

APPARATUS AND SYSTEM FOR INSTALLING RIVETS IN BELT FASTENERS

BACKGROUND OF THE INVENTION

The present invention generally relates to an improved apparatus and system for attaching a belt fastener assembly to an end of a belt with rivets. The present invention is more particularly directed to such an apparatus and system which permits the rivets to be installed by use of a non-manually powered driving tool resulting in savings in labor, minimizing fatigue of rivet installers, and more consistent belt fastener attachment of high integrity.

For more than two decades, rivet systems have been available to secure belt fasteners to conveyor belting. Over this time, modest improvements have been made to such systems. Most of these improvements have been directed to the driving of single rivets or multiple rivets with manual force through the use of a hammer.

The belt fastener generally includes an upper plate for overlying one side of the belt end and a lower plate for underlying the other side of the belt end. The plates include rivet receiving apertures which are either alignable or fixedly aligned by a U-shaped connection between the plates adapted to receive a hinge pin.

Such systems generally also utilize rivet assemblies. Each rivet assembly includes a rivet having a shank, a domed head at one end of the shank, and a counter sink within the opposite end of the shank. The rivet assembly also includes a pilot nail extending from the counter sink of the rivet.

When a rivet is installed through the use of such a manual system, the first strike of the rivet assembly drives the rivet assembly through a rivet receiving aperture of the top plate. The pilot nail pierces the belt and guides the rivet into position through the aligned rivet receiving apertures of the upper and lower plates while the pilot nail is received within an anvil die aperture of an anvil die plate. The anvil die aperture fixes the pilot nail relative to the rivet such that during subsequent successive strikes with a hammer, a die forming head of the pilot nail deforms the counter sink outwardly and upwardly to clinch the counter sunk end of the rivet to the underside of the lower plate. U.S. Pat. No. 3,913,180 shows and describes such a system, which patent is incorporated herein by reference.

The force required to manually drive each rivet assembly one at a time as described above requires a hammer weighing on the order of two pounds. Between five to ten strikes with the hammer are generally required to complete the process for each rivet. Because a typical 48"-wide belt generally requires 270 rivets to be driven, up to 2,700 hammer strikes are required to complete the belt fastener attachment. This is not only fatiguing to the rivet installer, but it can also take between 45 minutes to one hour to complete an installation.

While drive tools for manually driving up to five rivet assemblies at a time have been developed, these tools require about five times the force for each strike. Hammers weighing about five pounds have been used with such tools. While much greater physical effort is therefore required with such tools, such tools do provide a small time advantage as compared to single rivet tools.

Unfortunately, in addition to the time and fatigue disadvantages of manual tools, not all manual installers generate the same striking force. In fact, the same manual installer will not generate the same driving force for each rivet assembly strike. This results in non-uniform clinching of the rivets and hence non-uniform compression of the belt along its entire width.

Alignment of the rivet assemblies with the rivet receiving apertures of the upper and lower fastener plates and the anvil die apertures is also important to assure a uniform clinch of the counter sunk end of the rivets. This provides a uniform and secure clinch of the rivet to the fastener lower plate. Unfortunately, manual installation dictates rather loose alignment tolerance resulting in rivet clinches which have less than desired integrity.

The apparatus and system of the present invention overcomes the aforementioned disadvantages of the prior art. By virtue of the present invention, belt fasteners are permitted to be attached to belts by use of a non-manually powered rivet driving tool. Such non-manually powered driving tools generate the same force for each rivet strike resulting in uniform clinching of each rivet. Further, only two rivet strikes are uniformly required to install each rivet by virtue of the present invention. This further provides rivet installation uniformity and results in less installation time. Further, by virtue of the present invention, closer alignment of the rivet assemblies to the rivet receiving apertures of the upper and lower plates and to the anvil die apertures may be achieved. This results in more consistent uniform rivet clinches of high integrity. Further, because the present invention permits a non-manually powered drive tool to be used, installation fatigue is substantially reduced. The present invention therefore substantially reduces installation cost, minimizes installer fatigue, and produces more consistent belt fastener attachment of high integrity.

SUMMARY OF THE INVENTION

The present invention therefore provides an apparatus for facilitating the attachment of a belt fastener assembly to an end of a belt with rivets and by a non-manually powered rivet assembly drive tool having a rivet assembly dispensing barrel. The belt fastener assembly includes an upper plate for overlying one side of the belt end and a lower plate for underlying the other side of the belt end. The upper and lower plates have a plurality of aligned rivet receiving apertures. Each rivet assembly includes a rivet having a domed head at one end and a counter sink at an opposite end and a pilot nail extending from the rivet. The pilot nail has a die forming head carried by the rivet counter sink. The apparatus comprises an anvil die plate including a plurality of anvil die apertures alignable with the rivet receiving apertures of the upper and lower plates of the belt fastener assembly. Each anvil die aperture receives a pilot nail and fixes the pilot nail relative to its corresponding rivet to cause the die forming head to deform the counter sink of the rivet and clinching the opposite end of the rivet to the lower plate when the rivet opposite end is power driven against the die surface. The apparatus further includes a guide template for overlying the upper plate of the belt fastener assembly and includes a plurality of guide apertures alignable with the anvil die apertures of the anvil die plate and the rivet receiving apertures of the upper and lower plates of the belt fastener assembly when brought into registration therewith. Each guide aperture is slightly larger than the rivet assembly dispensing barrel of the non-manually powered rivet assembly drive tool for receiving the rivet assembly dispensing barrel of the non-manually powered rivet assembly drive tool and aligning the rivet assembly dispensing barrel of the rivet assembly drive tool with its respective aligned anvil die aperture and rivet receiving apertures. The apparatus further includes registration means for maintaining the alignment of the guide apertures of the guide template with the anvil die apertures of the anvil die plate and the rivet receiving apertures of the upper and lower plates of the belt fastener assembly.

The present invention further provides a system for attaching a belt fastener assembly to an end of a belt with rivets. The belt fastener assembly includes an upper plate for overlying one side of the belt end and a lower plate for underlying the other side of the belt end. The upper and lower plates have a plurality of aligned rivet receiving apertures. Each rivet has a domed head at one end and a counter sink at an opposite end and forms a rivet assembly with a pilot nail extending from the rivet. The pilot nail has a die forming head carried by the rivet counter sink. The system comprises a non-manually powered rivet assembly drive tool having a rivet assembly dispensing barrel for holding and power driving a rivet assembly and an anvil die plate including a plurality of anvil die apertures alignable with the rivet receiving apertures of the upper and lower plates of the belt fastener assembly. Each anvil die aperture receives a pilot nail and fixes the pilot nail relative to its corresponding rivet to cause the die forming head to deform the counter sink of the rivet and clinch the opposite end of the rivet to the lower plate when the rivet opposite end is power driven against the die forming head. The system further includes a guide template for overlying the upper plate of the belt fastener assembly and includes a plurality of guide apertures alignable with the anvil die apertures of the anvil die plate and the rivet receiving apertures of the upper and lower plates of the belt fastener assembly when brought into registration therewith. Each guide aperture is slightly larger than the rivet assembly dispensing barrel of the non-manually powered rivet assembly drive tool for receiving the rivet assembly dispensing barrel of the non-manually powered rivet assembly drive tool and aligning the rivet assembly dispensing barrel and the rivet assembly held within the rivet assembly dispensing barrel with its respective aligned anvil die aperture and rivet receiving aperture. The system further includes registration means for maintaining the alignment of the guide apertures of the guide template with the anvil die apertures of the anvil die plate and the rivet receiving apertures of the upper and lower plates of the belt fastener assembly.

BRIEF DESCRIPTION OF THE DRAWINGS

The features of the present invention which are believed to be novel are set forth with particularity in the appended claims. The invention, together with further objects and advantages thereof, may best be understood by making reference to the following description in conjunction with the accompanying drawings, in the several figures of which like reference characters identify identical elements, and wherein:

DETAILED DESCRIPTION OF THE PREFERRED EMBODIMENTS

Figure 1:
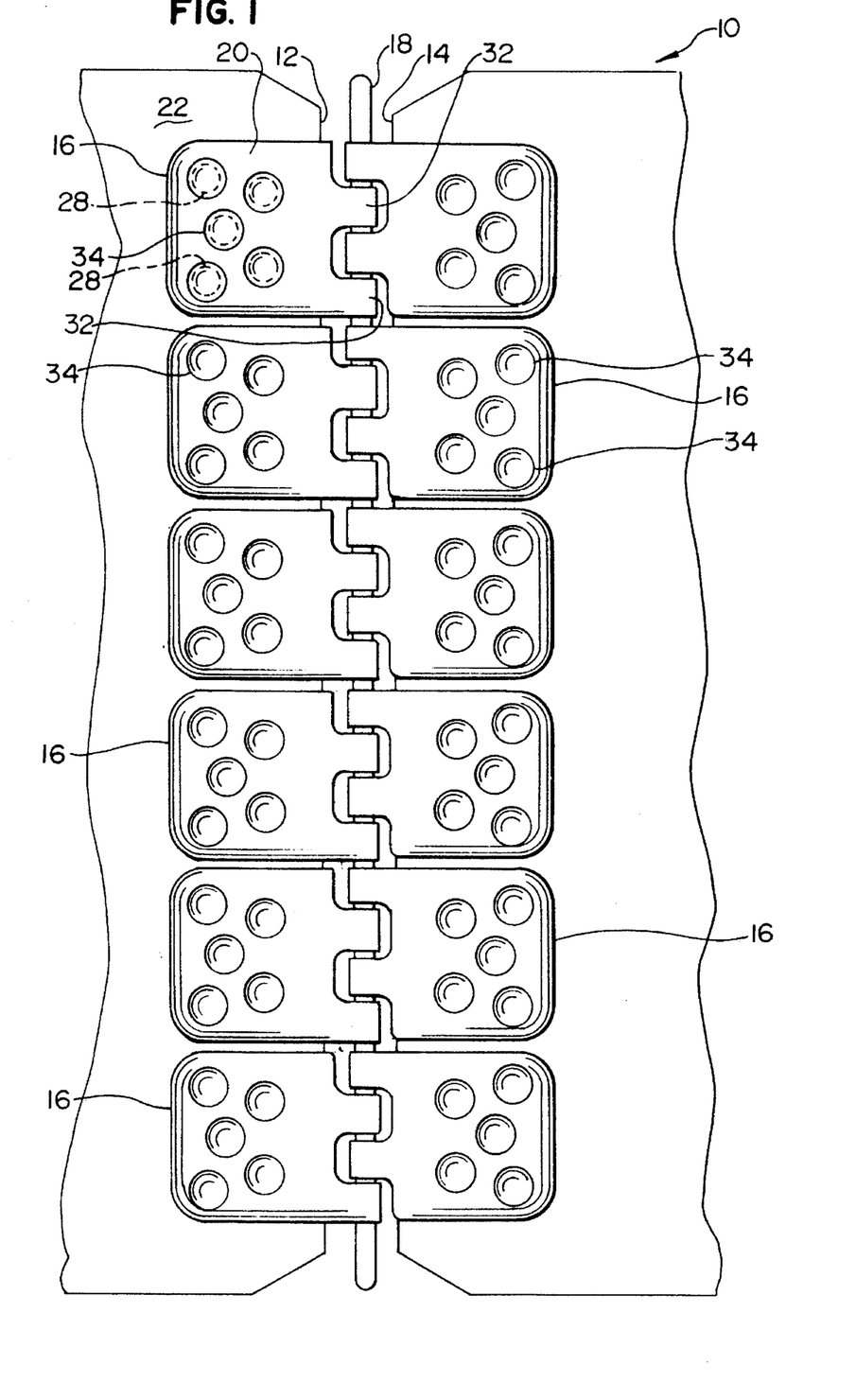
FIG. 1 is a top plan view of a conveyor belt having its ends coupled together by a plurality of belt fastener assemblies which have been attached to the belt ends in accordance with the present invention.
Figure 2:
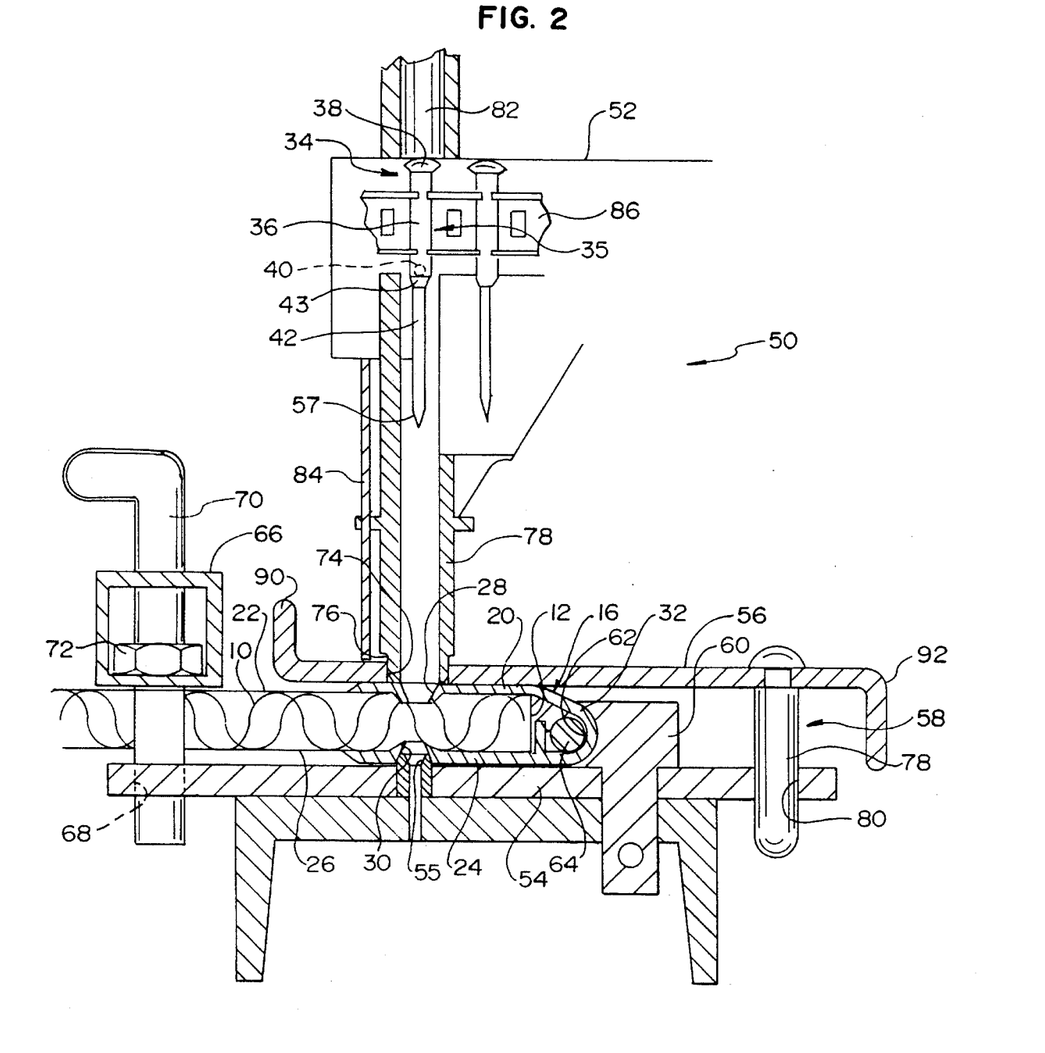
FIG. 2 is a cross-sectional side view of a system embodying the present invention for attaching the belt fastener assemblies to a belt end, the system being illustrated in a ready condition prior to driving a rivet assembly.

Referring now to FIG. 1, it illustrates a conveyor belt 10 having its ends 12 and 14 coupled together by a plurality of fastener assemblies 16 and a hinge pin 18. With reference also to FIG. 2, each of the fastener assemblies 16 includes an upper plate 20 for overlying one side 22 of the belt 10 and a lower plate 24 for underlying the other side 26 of the belt 10 at a belt end 12. The upper plate 20 includes a plurality of rivet receiving apertures 28 and the lower plate 24 similarly includes a like plurality of rivet receiving apertures, one of which is illustrated at 30, in FIG. 2. The rivet receiving apertures 28 of the upper plate 20 are aligned with the rivet receiving apertures 30 of the lower plate 24. In accordance with this preferred embodiment, the upper plate 20 of each fastener 16 is joined to its corresponding lower plate 24 by a plurality of U-shaped connections 32 which are dimensioned for receiving the hinge pin 18. Hence, when the fastener assemblies 16 are attached to the belt ends 12 and 14, the belt ends 12 and 14 are coupled together by the hinge pin 18 being inserted into the openings defined by the U-shaped connecting members 32.

As illustrated in FIG. 1, the conveyor belt 10 is wider in dimension than an individual belt fastener 16. As a result, a plurality of the belt fastener assemblies 16 are required for coupling the belt ends 12 and 14 together. Each of the belt fastener assemblies is attached to a belt end by a plurality of rivets 34. Each rivet 34, as may best be seen in FIG. 2, includes a shank 36 having at one end a domed head 38 and a counter sink 40 at the other end of the shank 36. Each rivet 34 forms a rivet assembly 35 with a pilot nail 42 having a die forming head 43 carried by the rivet counter sink 40 and the pilot nail 42 extends from the rivet counter sink 40 and terminates in a pointed end 57.

As will be seen subsequently, the rivets 34 attach the ends of the belt 10 to the belt fastener assemblies 16. Each rivet is driven through a pair of the aligned rivet receiving apertures 28 and 30 of the upper and lower plates 20 and 24. The domed head 38 of each rivet is received within a rivet receiving aperture 28 of the upper plate 20 and the counter sink 40 of each rivet is deformed by the die forming head 43 of its corresponding pilot nail 42 to deform and clinch the counter sunk opposite end of the rivet to the lower plate 24 about its corresponding rivet receiving aperture of the lower plate 24.

Referring now more particularly to FIG. 2, it illustrates a system 50 for attaching with rivets the belt fastener assemblies 16 to the end 12 of the belt 10. The system 50 generally includes a non-manually powered rivet assembly driving tool 52, an anvil die plate 54, a guide template 56, and a registration means 58.

The anvil die plate 54 includes a plurality of anvil die apertures 55 which are alignable with the rivet receiving apertures 28 and 30 of the upper and lower plates 20 and 24 of the fastener assembly 16. The anvil die apertures 55 are configured for receiving a pilot nail 42 of a rivet assembly 35 and fixing the pilot nail relative to the rivet 34 when the counter sink 40 is driven against the die forming head 43 of the pilot nail 42. The pilot nail 42 has a pointed end 57 for extending through the apertures 28 and 30 and piercing the belt 10 when the rivet assembly 35 is driven through the rivet receiving apertures 28 and 30.

To position the fastener assembly 16 on the anvil die plate 54 such that the rivet receiving apertures 28 and 30 are aligned with the anvil die apertures 55, the anvil die plate 54 carries a plurality of pin receiving blocks 60 which are spaced apart along the longitudinal dimension of the anvil die plate 54. The pin receiving blocks include a through bore 62 for receiving a pin 64 which is extended through the bores 62 and the U-shaped connect members 32 for aligning the anvil die apertures 55 with the rivet receiving apertures 28 and 30.

A hold down bar 66 extends in a longitudinal direction with respect to the anvil die plate 54 in a manner known in the art for holding the belt 10 in a fixed position on the anvil die plate. To that end, the anvil die plate includes a threaded bore 68 for threadingly receiving a threaded member 70. Within the hold down bar 66 is a nut 72 which also threadingly receives the threaded member 70. As a result, when the threaded member 70 is turned, the nut 72 and threaded bore 68 co-act with the threaded member 70 to tighten the hold down bar 66 onto the belt 10 so that the belt 10 is securely held between the anvil die plate 54 and the hold down bar 66.

The guide template 56, as illustrated, is arranged to extend over the upper plate 20 of the belt fastener assembly 16. The guide template 56 includes a plurality of guide apertures 74 which are alignable with the anvil die apertures 55 and the rivet receiving apertures 28 and 30. The guide apertures 74 are slightly larger in diameter dimension than a reduced diameter end portion 76 of a rivet assembly dispensing barrel 78 of the non-manually powered rivet assembly drive tool 52 for receiving the rivet assembly dispensing barrel end 76 and aligning it with a respective aligned anvil die aperture 55 and rivet receiving apertures 28 and 30.

The alignment of the guide apertures 74 of the guide template 56 is maintained by the registration means 58. The registration means 58 includes at least one guide pin 78 which is carried by the guide template 56 and received by a guide through bore 80 formed in the anvil die plate 54. Preferably, as will be seen in FIG. 3, a plurality of guide pins 78 and corresponding guide bores 80 are provided in aligned relation and along the longitudinal dimension of the anvil die plate 54. The pin 78 is slidingly received within the guide bore 80 to permit the guide template 56 to be in contact with the upper plate 20 of the belt fastener assembly 16.

The non-manually powered rivet assembly drive tool 52, in addition to the rivet assembly dispensing barrel 78, includes a drive piston 82 and a safety lever 84. The safety lever 84, when the reduced diameter portion 76 of the barrel 78 is received within a guide aperture 74 of the guide template 56 is pushed upwardly by the guide template 56 and retracted to enable the driving of a rivet assembly 35. As a safety feature, when the safety lever 84 is not retracted, the tool 52 is rendered disabled from driving a rivet assembly 35.

The drive piston 82 is powered by non-manual power, such as compressed air. When a rivet assembly 35 is driven by the piston 82, the rivet assembly 35 is first detached from a rivet assembly supply strip 86 to be described hereinafter and then driven down the barrel 79 through the rivet receiving apertures 28 and 30 until the die forming head 43 of the pilot nail 42 engages the anvil die aperture 55. This constitutes the first strike of the rivet assembly 35. As will be seen hereinafter, during a second strike of the rivet assembly 35, the die forming head 43 of the pilot nail 42, which is fixed with respect to the rivet 34, deforms the counter sink 40 to clinch the counter sunk end of the rivet 34 to the lower plate 24 of the belt fastener assembly 16.

Figure 3:
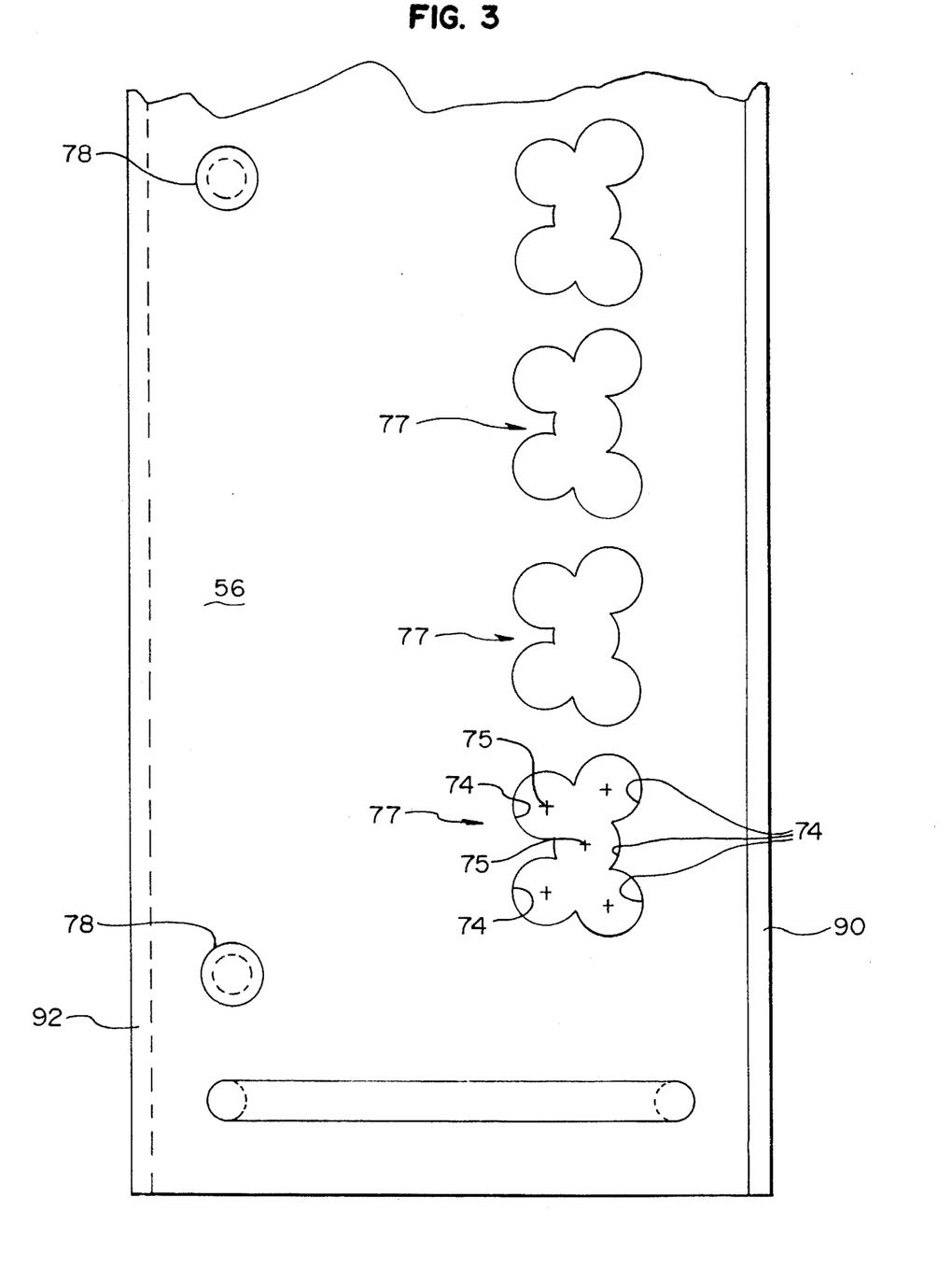
FIG. 3 is a partial top plan view of a guide template employed in the system of FIG. 2.

Referring now to FIG. 3, it illustrates the guide template 56 in top plan view. As will be noted in FIG. 3, the guide template 56 carries a plurality of the guide pins 78 which are spaced apart along the longitudinal dimension of the guide template 56. Preferably, the guide pins 78 are provided at approximately one foot intervals.

As will also be noted in FIG. 3, the plurality of guide apertures are intersecting to provide, for each belt fastener 16, a cluster 77 of guide apertures. Each guide aperture 74 defines an arc greater than 180° so that the reduced diameter portion 76 of the drive barrel 78 is confinable in a fixed position within each guide aperture. Each of the guide apertures 74 also defines a center 75 which, when the guide template 56 is brought into registration with the rivet receiving apertures 28 and 30 and the aligned anvil die apertures 55, will be centered with respect to the centers of those apertures.

As will be further noted in FIG. 3, a plurality of the guide aperture clusters 77 is provided within the template 56. Preferably, there is one guide aperture cluster 77 for each belt fastener 16 to be attached to the conveyor belt 10.

The guide plate 56 is preferably formed of 7-gauge steel to provide the guide plate with suitable strength. To render additional strength to the guide template 56, the guide template includes an upturned marginal flange 90 and a downturned marginal flange 92.

Figure 4:
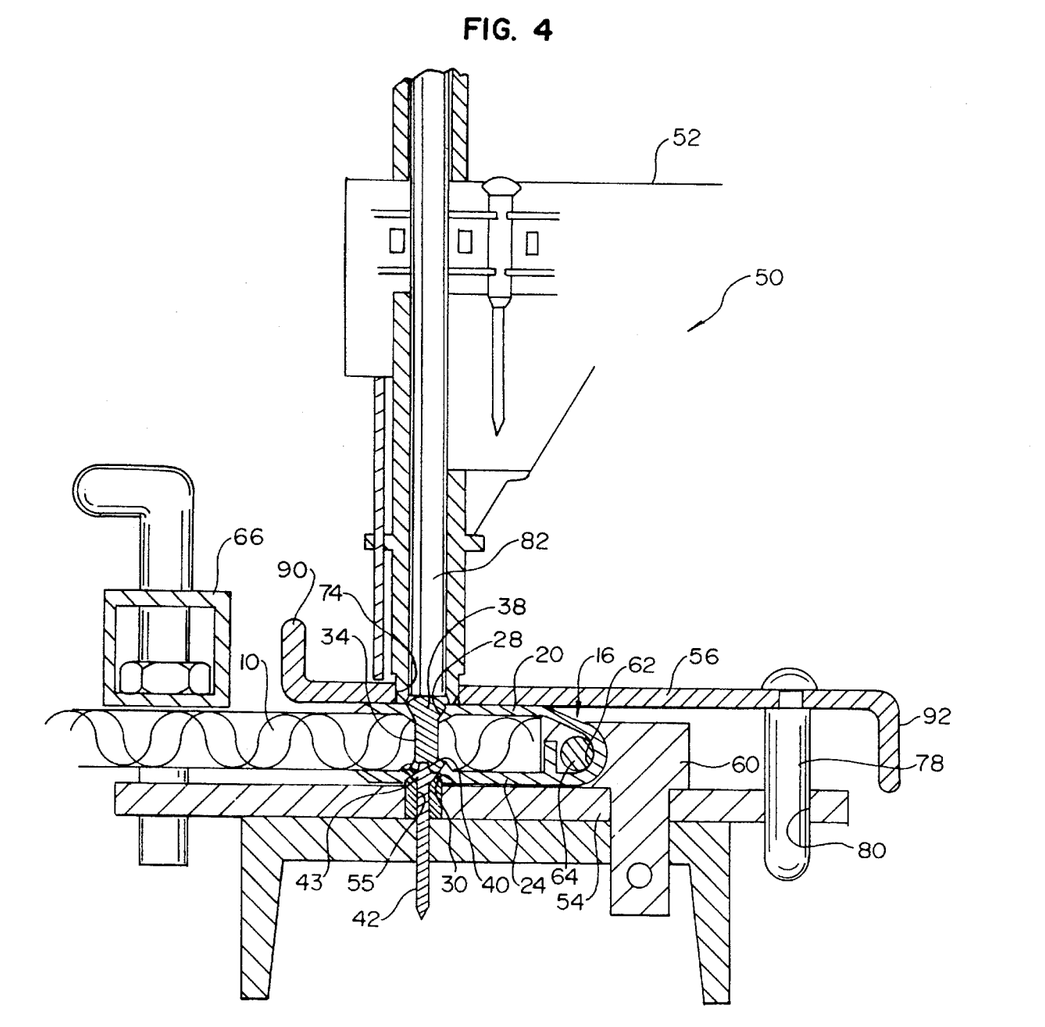
FIG. 4 is a cross-sectional side view of the system of FIG. 2, the system being illustrated in a condition after driving a rivet assembly.

Referring now to FIG. 4, it illustrates the system 50 in a condition after driving a rivet assembly through the aligned rivet receiving apertures 28 and 30 of the upper plate 20 and the lower plate 24 of the fastener assembly 16. As will be noted in FIG. 4, the pilot nail 42 has been received within the anvil die aperture 55 and the die forming head 43 of the pilot nail 42 has deformed the counter sink 40 of the rivet 34 for clinching the counter sink end of the rivet to the lower plate 24 of the fastener assembly 16. As will also be noted, the domed head 38 of the rivet 34 is confined within the rivet receiving aperture 28 of the upper plate 20 of the fastener assembly 16.

For clinching the counter sink 40 to the lower plate 24 of the fastener assembly 16, only two strikes of the rivet 34 by the piston 82 are required. Once a rivet is installed as illustrated in FIG. 4, the non-manually powered driving tool 52 is retracted from the guide aperture 74 and inserted into the next guide aperture for installing the next rivet. When all of the rivets are installed, the guide template 56 is removed from the anvil die plate 54, the hold down bar 66 is removed from the anvil die plate 54, and the belt 10 is removed from the anvil die plate 54.

Figure 5:
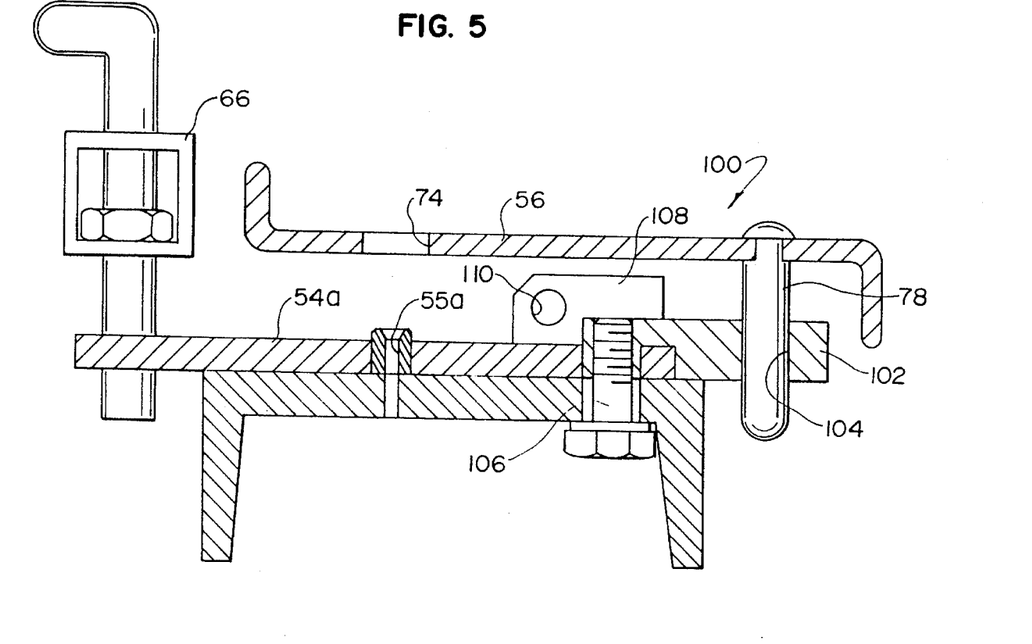
FIG. 5 is a cross-sectional side view of an apparatus structured in accordance with a second embodiment of the present invention.

Referring now to FIG. 5, it illustrates another apparatus for attaching the belt fastener assemblies to a belt end which is structured in accordance with a second embodiment of the present invention. The apparatus 100, like the apparatus of FIG. 2, includes a guide template 56 and a hold down bar 66. The guide template 56 carries a plurality of guide pins 78 for aligning the guide apertures 74 with the rivet receiving apertures of the upper and lower plates of a fastener assembly (not shown) and with the anvil die apertures 55a of an anvil die plate 54a. The anvil die plate 54a differs from the anvil die plate 54 of the apparatus of FIG. 2 in that the anvil die plate 54a does not include the guide bores for receiving the guide pins 78. Rather, the apparatus 100 includes a plurality of guide blocks which are secured to the anvil die plate 54a by corresponding threaded bolts 106 along the longitudinal dimension of the anvil die plate 54a. Each of the guide blocks 102 includes a guide bore 104 for slidingly receiving one of the guide pins 78 carried by the guide template 56. This structure permits the present invention to be practiced with virtually any prior art tool for adapting such a prior art tool for use with a non-manually powered rivet assembly drive tool as illustrated in FIGS. 2 and 4.

As in the embodiment of FIGS. 2 and 4, the guide pins 78 are slidingly received within the guide bores 104 to permit the guide template 56 to engage the upper plate of a fastener assembly (not shown). Also in a similar manner, the apparatus 100 includes a plurality of pin receiving blocks 108 also spaced along the longitudinal dimension of the anvil die plate 54a. Each pin receiving block 108 includes a pin receiving bore 110 for receiving a pin for aligning the rivet receiving apertures of the upper and lower plates of a belt fastener assembly in a manner as previously described with respect to FIGS. 2 and 4. Each pin receiving block 108 may be formed with a respective one of the guide blocks 102 in a single unitary construction.

Figure 6:
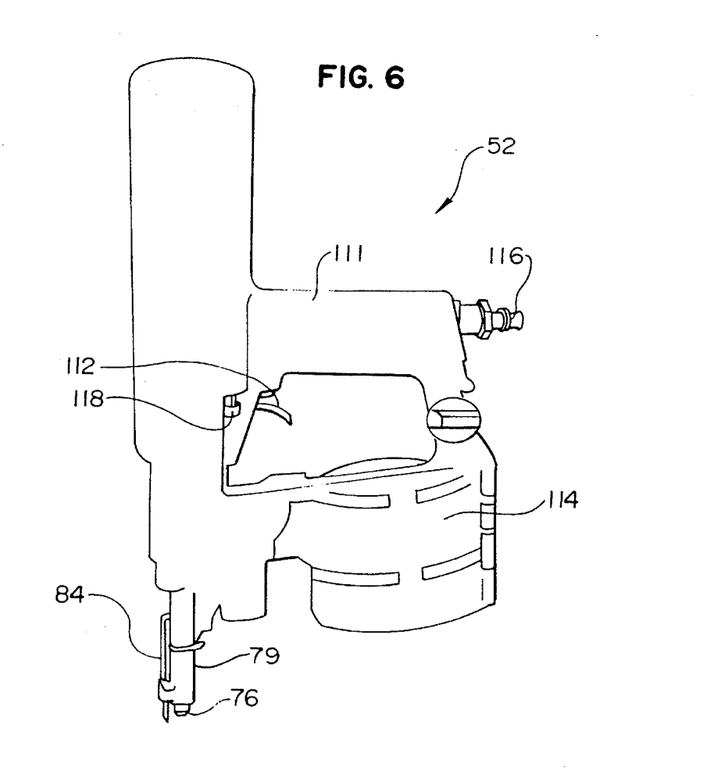
FIG. 6 is a side view of a non-manually powered rivet assembly drive tool which forms a component part of the system of FIG. 2 in accordance with the present invention.

Referring now to FIG. 6, it is a side view of a non-manually powered rivet assembly drive tool 52 in accordance with the present invention. The tool 52 includes a grip handle 111, a trigger 112 which may be depressed for driving a rivet assembly, and a housing 114 for holding a plurality of collated rivet assemblies in a manner to be described hereinafter. The housing 114 is preferably cylindrical in configuration for containing a supply strip of rivet assemblies which is arranged in a coiled or rolled configuration.

The tool 52 further includes an inlet 116 for connection to a source of compressed air which provides the driving force for the piston 82 (FIGS. 2 and 4).

The tool 52 further includes an arming button 118. When the arming button 118 is depressed, a next rivet assembly to be driven is loaded into the barrel of the tool 52 and disposed for being driven as illustrated in FIG. 2. Also shown in FIG. 6 is the rivet assembly dispensing barrel 78 and its reduced diameter or chamfered portion 76 together with the safety lever 84 previously described.

Figure 7:
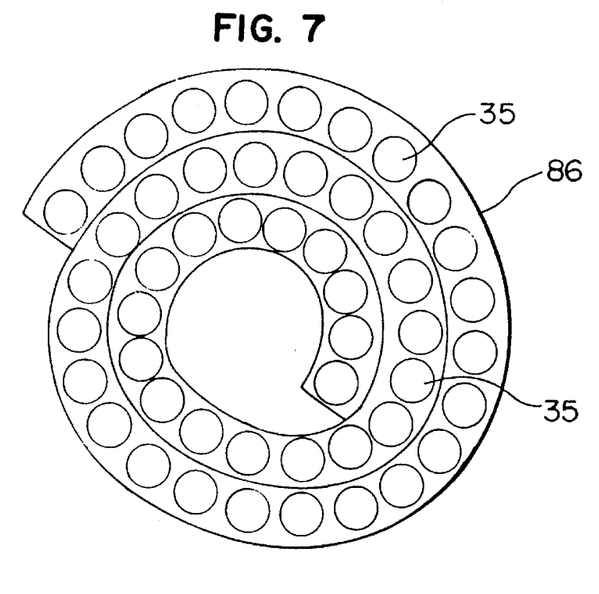
FIG. 7 is a top plan view of a rivet assembly supply strip having a rolled configuration in accordance with the preferred embodiment of the present invention.

Referring now to FIG. 7, it is a top view of a rivet assembly supply strip 86 in a rolled configuration in accordance with the preferred embodiment of the present invention. As previously mentioned, the housing 114 of the tool 52 is preferably cylindrical in configuration. This enables the housing 114 to store a plurality of rivet assemblies 35 in a rolled configuration on a strip 86 as shown in FIG. 7.

Figure 8:
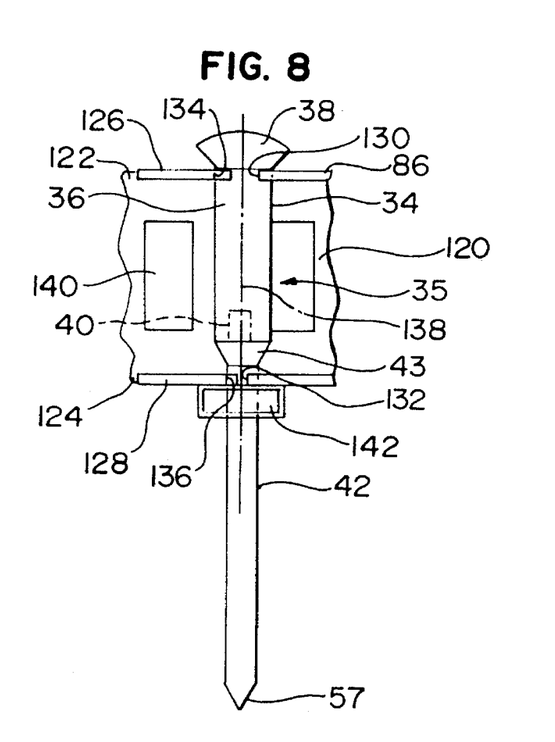
FIG. 8 is side view to an enlarged scale illustrating one collated rivet assembly carried by the rivet assembly supply strip of FIG. 7.

FIG. 8 is a side view, to an enlarged scale, illustrating one collated rivet assembly 35 carried by the rivet assembly supply strip 86. As previously described, the rivet assembly 35 includes a rivet 34 and a pilot nail 42. The rivet 34 has a domed head 38 at one end and a counter sink 40 at an opposite end. The pilot nail 42 includes the die forming head 43 which is carried by the counter sink 40 and a pointed tip 57. As will be noted in FIG. 8, the shank 36 of the rivet 34 has a diameter which is greater than the diameter of the pilot nail 42.

The rivet assembly supply strip 86 includes a base 120 having opposed side margins 122 and 124. For each rivet assembly, the supply strip 86 includes extensions 126 and 128 which extend from the side margins 122 and 124 respectively substantially transverse to the base 120. The extensions 126 and 128 include opened slots 130 and 132 for holding the rivet assembly 35 across the extensions 126 and 128. The slot 130 is larger than the slot 132. Thus, the slot 130 is dimensioned for holding the rivet 34 and the slot 132 is dimensioned for holding the pilot nail 142.

The slots 130 and 132 are circular in cross-section. The diameter 134 of slot 130 is thus larger than the diameter 136 of slot 132. The circular slots 130 and 132 are aligned on a common center 138 for accurately disposing the rivet assembly 35 and aligning the rivet assembly with the center of the rivet assembly dispensing barrel 78 of the tool 52 (FIG. 2) to assure that the rivet assembly 35 will be driven through the centers of the rivet receiving apertures 28 and 30 of the fastener assembly 116 and the center of the anvil die apertures 55.

Preferably, the supply strip 86 is formed of plastic material such as polyethylene. The base 120 of the strip 86 is further provided with indexing cutout portions 140 to enable the rivet assemblies 35 to be accurately indexed into position within the tool 52. With the strip 86 being thus configured as described above, a uniform strip is provided which presents each rivet assembly 35 to the drive piston 82 in a uniform manner and, when struck by the drive piston 82, the rivet assemblies are separated from the strip 86 by being disengaged from the open-ended slots 130 and 132 and driven along a straight line through the centers of the rivet receiving apertures and the anvil die plate apertures.

As will be also noted in FIG. 8, the rivet assembly 35 is further provided with a guide tube 142 which may optionally be provided to further assure straight line movement of the rivet assembly as it is driven through the rivet assembly dispensing barrel 78 of the tool 52. The guide tube 142 may also be formed of polyethylene and is carried by the pilot nail 42. Preferably, the outer diameter dimension of the guide tube 142 is substantially equal to the diameter dimension of the domed head 38 of the rivet 34.

As can thus be seen, the present invention provides a new and improved apparatus and system for attaching a belt fastener assembly to an end of a belt with rivets. By virtue of the guide template and the precise registration of the guide plate guide apertures to the rivet receiving apertures and the anvil die apertures of the anvil die plate by the guide pins carried by the guide template, the present invention permits belt fasteners to be attached to belts by use of a non-manually powered rivet tool with extreme accuracy. Because a non-manually powered driving tool may be utilized for driving the rivet assemblies, the striking force for each rivet strike will be uniform. Such uniform striking force and the precise alignment of the rivet assemblies with the rivet receiving apertures of the fastener assemblies and with the anvil die apertures of the anvil plate, uniform clinching of the rivets to the lower fastener plate is assured. Further, since a non-manually powered driving tool may be utilized, fastener assembly attachment to belt ends may be achieved with less fatigue to the installer while also reducing installation time. As a result, the present invention overcomes the disadvantages of the prior art by substantially reducing installation cost, minimizing installer fatigue, and producing more consistent belt fastener attachment.

While particular embodiments of the present invention have been shown and described, modifications may be made, and it is therefore intended in the appended claims to cover all such changes and modifications which fall within the true spirit and scope of the invention.

What is claimed is:

1. An apparatus for facilitating the attachment of a belt fastener assembly to an end of a belt with rivets and by a non-manually powered rivet assembly drive tool having a rivet assembly dispensing barrel, the belt fastener assembly including an upper plate for overlying one side of the belt end and a lower plate for underlying the other side of the belt end, the upper and lower plates having a plurality of aligned rivet receiving apertures, and each rivet assembly including a rivet having a domed head at one end and a counter sink at an opposite end and a pilot nail extending from the rivet and having a die forming head carried by the rivet counter sink, said apparatus comprising:

an anvil die plate including a plurality of anvil die apertures alignable with the rivet receiving apertures of the upper and lower plates of the belt fastener assembly, each anvil die aperture for receiving a pilot nail and fixing the pilot nail relative to its corresponding rivet to cause the die forming head to deform the counter sink of the rivet and clinching the opposite end of the rivet to the lower plate when the rivet opposite end is power driven against the die forming head;

a guide template for overlying the upper plate of the belt fastener assembly and including a plurality of guide apertures alignable with the anvil die apertures of the anvil die plate and the rivet receiving apertures of the upper and lower plates of the belt fastener assembly when brought into registration therewith, each guide aperture being slightly larger than the rivet assembly dispensing barrel of the non-manually powered rivet assembly drive tool for receiving the rivet assembly dispensing barrel of the non-manually powered rivet assembly drive tool and alligning the rivet assembly dispensing barrel of the rivet assembly drive tool with its respective aligned anvil die aperture and rivet receiving apertures; and an alignment system for maintaining the alignment of the guide apertures of the guide template with the anvil die apertures of the anvil die plate and the rivet receiving apertures of the upper and lower plates of the belt fastener assembly, said alignment system comprising at least one guide pin carried by said guide template, and at least one guide through bore in the anvil die plate positioned for slidingly receiving said guide pin.

2. An apparatus as defined in claim 1 wherein the plurality of guide apertures are intersecting to form a cluster of the guide apertures.

3. An apparatus as defined in claim 1 wherein the guide template and the anvil die plate each has a longitudinal dimension and wherein the registration means includes a plurality of the guide pins carried by the guide template along the longitudinal dimension of the guide template and a corresponding plurality of the guide through bores in the anvil die plate along the longitudinal dimension of the anvil die plate.

4. An apparatus as defined in claim 3 wherein the plurality of guide pins and the corresponding plurality of guide through bores are dimensioned for sliding engagement to permit the guide template to be in contact with the upper plate of the belt fastener assembly.

5. An apparatus as defined in claim 1 wherein the registration means comprises at least one guide pin carried by the guide template and a guide block carried by the anvil die plate, the guide block including a guide through bore for receiving the guide pin.

6. An apparatus as defined in claim 5 wherein the guide template and the anvil die plate each has a longitudinal dimension, and wherein the alignment system comprises a plurality of the guide pins carried by the guide template along the longitudinal dimension of the guide template and a corresponding plurality of the guide blocks carried by the anvil die plate along the longitudinal dimension of the anvil die plate, each guide block including a guide through bore for receiving one of the guide pins.

7. An apparatus as defined in claim 6 wherein the guide pins and the guide through bores of the guide blocks are dimensioned for sliding engagement to permit the guide template to be in contact with the upper plate of the belt fastener assembly.

8. A system for attaching a belt fastener assembly to an end of a belt with rivets, the belt fastener assembly including an upper plate for overlying one side of the belt end and a lower plate for underlying the other side of the belt end, the upper and lower plates having a plurality of aligned rivet receiving apertures, and each rivet having a domed head at one end and a counter sink at an opposite end and forming a rivet assembly with a pilot nail extending from the rivet and having a die forming head carried by the rivet counter sink, sand system comprising:

a non-manually powered rivet assembly drive tool having a rivet assembly dispensing barrel for holding and power driving a rivet assembly;

an anvil die plate including a plurality of anvil die apertures alignable with the rivet receiving apertures of the upper and lower plates of the belt fastener assembly, each anvil die aperture for receiving a pilot nail and fixing the pilot nail relative to its corresponding rivet to cause the die forming head to deform the counter sink of the rivet and clinching the opposite end of the rivet to the lower plate when the rivet opposite end is power driven against the die forming head;

a guide template for overlying the upper plate of the belt fastener assembly and including a plurality of the guide apertures alignable with the anvil die apertures of the anvil die plate and the rivet receiving apertures of the upper and lower plates of the belt fastener assembly when brought into registration therewith, each guide aperture being slightly larger than the rivet assembly dispensing barrel of the non-manually powered rivet assembly drive tool for receiving the rivet assembly dispensing barrel of the non-manually powered rivet assembly drive tool and aligning the rivet assembly dispensing barrel and the rivet assembly held within the rivet assembly dispensing barrel with its respective aligned anvil die aperture and rivet receiving apertures; and an alignment system for maintaining the alignment of the guide apertures of the guide template with the anvil die apertures of the anvil die plate and the rivet receiving apertures of the upper and lower plates of the belt fastener assembly, said alignment system comprising at least one guide pin carried by said guide template, and at least one guide through bore in the anvil die plate positioned for slidingly receiving said guide pin.

9. A system as defined in claim 8 wherein the plurality of guide apertures are intersecting to form a cluster of the guide apertures.

10. A system as defined in claim 8 wherein the guide template and the anvil die plate each has a longitudinal dimension and wherein the registration means includes a plurality of the guide pins carried by the guide template along the longitudinal dimension of the guide template and a corresponding plurality of the guide through bores in the anvil die plate along the longitudinal dimension of the anvil die plate.

11. A system as defined in claim 10 wherein the plurality of guide pins and the corresponding plurality of guide through bores are dimensioned for sliding engagement to permit the guide template to be in contact with the upper plate of the belt fastener assembly.

12. A system as defined in claim 8 wherein the registration means comprises at least one guide pin carried by the guide template and a guide block carried by the anvil die plate, the guide block including a guide through bore for receiving the guide pin.

13. A system as defined in claim 8 wherein the guide template and the anvil die plate each has a longitudinal dimension, and wherein the registration means comprises a plurality of the guide pins carried by the guide template along the longitudinal dimension of the guide template and a corresponding plurality of the guide blocks carried by the anvil die plate along the longitudinal dimension of the anvil die plate, each guide block including a guide through bore for receiving one of the guide pins.

14. A system as defined in claim 13 wherein the guide pins and the guide through bores of the guide blocks are dimensioned for sliding engagement to permit the guide template to be in contact with the upper plate of the belt fastener assembly.

15. A system as defined in claim 8 further including a rivet assembly supply strip containing a plurality of the rivet assemblies, the supply strip including a base having opposed side margins and, for each rivet assembly, first and second extensions extending from the opposed side margins substantially transverse to the base, the extensions including first and second opened slots respectively for holding a rivet assembly across the first and second extensions, and wherein the non-manually powered rivet assembly drive tool includes a housing for storing the rivet assembly supply strip.

16. A system as defined in claim 15 wherein the rivet of each rivet assembly has a first diameter dimension, wherein the pilot nail of each rivet assembly has a second diameter dimension, wherein the first opened slot of the first extension is dimensioned for holding the rivet and the second opened slot of the second extension is dimensioned for holding the pilot nail.

17. A system as defined in claim 16 wherein the first diameter dimension is greater than the second diameter dimension and wherein the first opened slot is greater in dimension than the second opened slot.

18. A system as defined in claim 17 wherein the domed head of each rivet has a third diameter dimension, and wherein each rivet assembly includes a guide tube carried by the pilot nail and having a major diameter dimension substantially equal to the third diameter dimension, the guide tube for guiding a rivet assembly down the rivet assembly dispensing barrel upon being driven.

* * * * *